United States Patent
Kinoe et al.

(10) Patent No.: US 6,337,700 B1
(45) Date of Patent: Jan. 8, 2002

(54) CONTROL APPARATUS AND METHOD OF SELECTING A GRAPHICAL OBJECT AND CHANGING DISPLAY ATTRIBUTES THEREOF

(75) Inventors: Yohsuke Kinoe, Yokohama; Toshiyuki Hama, Tokyo-to, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/307,463

(22) Filed: May 7, 1999

(30) Foreign Application Priority Data

Jul. 23, 1998 (JP) .......................................... 10-207291

(51) Int. Cl.⁷ ............................. G06F 3/14; G06T 5/00; G06T 17/40
(52) U.S. Cl. ....................... 345/854; 345/863; 345/856; 345/850; 345/630; 345/420; 345/964; 345/766
(58) Field of Search ................................. 345/854, 863, 345/856, 850, 630, 420, 964, 621, 421, 419, 766, 767, 768, 833, 848, 851, 852, 853

(56) References Cited

U.S. PATENT DOCUMENTS 4,868,766 A * 9/1989 Oosterholt .................. 345/420

5,459,831 A * 10/1995 Brewer et al. ............... 345/853
5,825,998 A * 10/1998 Brechner ................. 345/420 X
6,130,670 A * 10/2000 Porter ........................ 345/421
6,154,213 A * 11/2000 Rennison et al. ........... 345/854
6,204,850 B1 * 3/2001 Green ......................... 345/850

FOREIGN PATENT DOCUMENTS

JP 05-303616 11/1993

* cited by examiner

*Primary Examiner*—Raymond J. Bayerl
(74) *Attorney, Agent, or Firm*—Louis J. Percello; Fitch, Even, Tabin & Flannery

(57) ABSTRACT

A method of quickly displaying a truly intended graphical object among graphical objects hidden in complex in the screen by a simple mouse operation. A group of graphical objects which are a set of a plurality of graphical objects is displayed on a display screen. Each graphical object is managed by a hierarchical structure and displayed in the display screen based on graphical definition data. When an operator selects one graphical object from a group of graphical objects, an operation tablet is generated. When the operator moves a pointer to the right on the operation tablet, graphical objects positioned fore side are changed to non-display one after another and a graphical object hiding behind them is revealed. By moving the pointer downwardly after the operator clicks the left button of a mouse, graphical objects of the same hierarchy as the focused graphical object are changed to non-display in unison so that a desired graphical object can be efficiently searched for selection.

6 Claims, 14 Drawing Sheets

| Object Name 201 | Object Definition Data 203 |
|---|---|
| object 1 | Function 1 |
| object 2 | Function 2 |
| ⋮ | ⋮ |

| Index 211 | Depth Display Attribute 213 | Hierarchy Display Attribute 215 | Highlight Attribute 217 | Pointer 219 |
|---|---|---|---|---|
| 1 | 1 | 1 | 0 | pointer object-1 |
| 2 | 0 | 0 | 1 | pointer object-2 |
| ⋮ | ⋮ | ⋮ | ⋮ | ⋮ |

Graphical Object/Display State Table 109

Graphic Object Hierarchy Definition Data
/ 115

1. Car Body
    1.1 Front Bumper
    1.2 Grill
2. Engine (Engine-OHV)
    2.1 Cylinder Head
    2.2 Valves
        2.2.1 Valves A (Fuel Injection Valve Unit)
        2.2.2 Valves B (Start Valve Unit)
        2.2.3 Valves C (Exhaust Valve Unit)
            2.2.3.1 Cam
            2.2.3.2 Tappet
            2.2.3.3 Push Rod
            2.2.3.4 Valve Spring
            2.2.3.5 Rocker-arm
        2.2.4 Valves D (Exhaust Valve)
    2.3 Cylinder Block
    2.4 Cylinder Liner
    2.5 Main Bearing
    2.6 Crankshaft
    2.7 Piston
    2.8 (Connecting Rod)
    2.9 (Engine Cover Section)
3. (Power Transmission Device)
    3.1 Clutch
    3.2 Transmission
    3.3 Wheel Drive System
    3.4 Propeller Shaft
    3.5 Gear Box
4. Brake System
5. Tire and Wheel
6. Suspension System
7. Steering

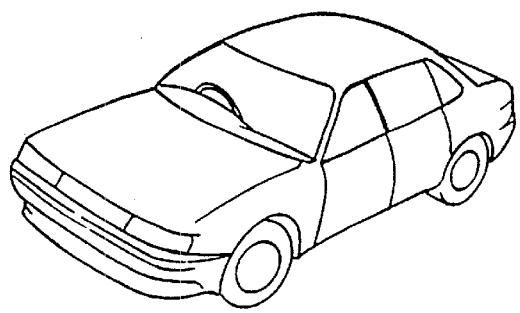
Figure 13
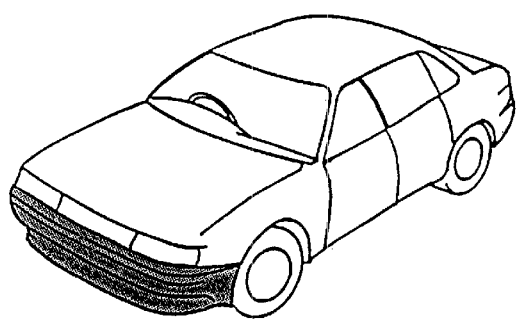 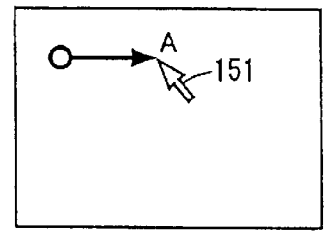
Figure 14
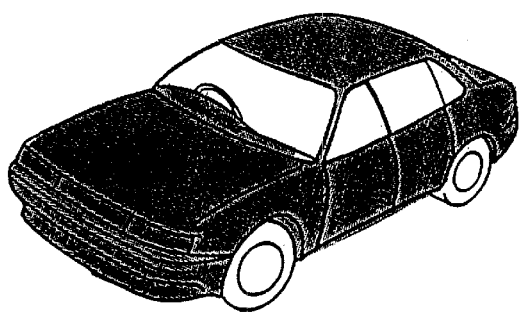 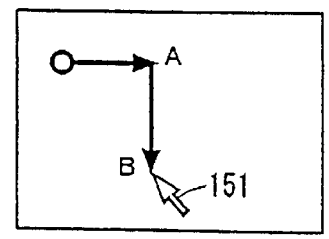
Figure 15

CONTROL APPARATUS AND METHOD OF SELECTING A GRAPHICAL OBJECT AND CHANGING DISPLAY ATTRIBUTES THEREOF

TECHNICAL FIELD

The present invention relates to a method of displaying a graphical object and, more particularly, to a method of selectively displaying multiple graphical objects.

BACKGROUND

A 3D graphics software has been conventionally used in a industrial design and the like. For example, in the circumstance of designing automobiles, the 3 D graphics software is used in reviewing the design or layout of parts in the whole automobile based on designed parts which are assembled into a 3D mockup.

Characteristics of the use of the 3 D graphic software in such environment include:

There are very many graphical objects displayed in the screen and the total number of the graphical objects may amount to several thousands.

A graphical object (part) to be operated (selected) may often be hidden (included) behind another object.

The software is supposed to be used not only the designer himself or herself but also by a wide range of users who do not know the precise position or the name of individual object, such as other enterprises and other sections including sales/service sections.

These characteristics are a general problem which a full scale 3 D graphic software faces more or less without being limited to a graphics software customized to automobiles.

The operation to select a graphical object (part) on the screen is one of the most basic operations which an operator performs in using a 3 D graphic software. However, the operation to select only an intended graphical object among graphical objects crowded in the display screen is very difficult because the aimed object is hidden among other crowded objects, overlapped in many folds, or entirely included in other object.

This operation stresses the operator but the efficiency of operations using a 3 D graphic software will be remarkably improved if the user can do this easily.

Techniques of selecting graphical objects in a conventional 3 D graphic software included:

Search by a part name

A graphic software such as a CAD, for example, "VisMockup" of Engineering Animation Co., (Nikkei Digital Engineering, February 1998, pp 94–95), provides a method of presenting a list of graphical objects (parts) to a user to allow the user to select a desired object from the list. It was necessary for the operator to know the name of the part in this method and a substantial education was required for the operator.

Further, the efficiency was low because a registered name had to be located in the list of several thousands items every time an object is selected even when it was known that the object had a certain shape and was in a certain position. In addition, because the graphical object was selected at a place which is different from the place where that graphical object was displayed, the view point had to be moved from the list of parts to a browser every time an object is selected so that the operation efficiency was low and it took a long time until the object was recognized.

Method using a cross sectional view

There is a method of displaying a cross section of 3 D to reveal a 3 D object hidden behind a surface as seen in "VisMockup" of Engineering Animation Co., (Nikkei Digital Engineering, February 1998, pp 94–95). This function aims at scrutiny of the configuration of 3 D objects. When this function is applied to supporting the selection of an object, the following problems were involved.

(1) Response: The response in displaying a cross section is very slow (the response from the time when an axis to scan is designated until the first cross section is displayed, and the response in re-displaying a cross section each time when it is slid).

(2) Identifiability: It is difficult to identify an aimed object because many objects are displayed beside the aimed object and very many unnecessary displays formed by these objects remain. It is also difficult to identify the aimed object because it is displayed in a cross section.

SUMMARY OF THE INVENTION

Accordingly, it is an object of this invention to quickly display an intended graphical object exactly from graphical objects hidden in complex within the screen in using a graphic software by a simple mouse operation which an operator can intuitively understand;

It is another object of this invention to provide a graphical display control system which can simply recover an erroneous operation by an operator;

It is another object of this invention to provide a graphical display control system which can operate in a high speed by limiting the amount of data to a minimum;

It is another object of this invention to provide a graphical display control system which does not depend on a platform;

It is another object of this invention to provide a graphical display control system which can reduce resources required for the system to a minimum.

The invention relates therefore to a group of graphical objects which is a set of multiple graphical objects are displayed on a display screen. Each graphical object is managed by a hierarchical structure and is displayed in the display screen based on graphic definition data. When an operator selects one graphical object from the group of graphical objects, an operation tablet is generated. When the operator moves a pointer to the right on the operation tablet, graphical objects placed in the fore side are turned to non-display one after another and graphical objects hidden behind them come to show up. By moving the pointer downwardly after the operator clicks the left button, graphical objects in the same hierarchy as the focused graphical object can be simultaneously turned to non-display to allow a desired graphical object to be searched efficiently for selection.

In one aspect, this invention provide a method of selecting one graphical object among a group of graphical objects displayed in a display screen based on graphic definition information of multiple graphical objects which are managed by hierarchical attribute information on a graphical objects display control apparatus having a display screen and an input device, said method comprising;

(a) a step of displaying a group of graphical objects on said display screen, (b) a step of displaying on said display screen an operation tablet in which an operable pointer is positioned by said input device, (c) a step of detecting the movement of said pointer in a first direction on said operation tablet, (d) a step of modifying a display attribute of a second lie graphical object ordered next to a first graphical object depending on said graphic definition information in response to the detection of the movement of said pointer in the first direction, (e) a step of detecting the movement of said pointer in a second direction on said operation tablet, (f) a step of modifying a display attribute of a third and a fourth graphical objects having a common hierarchical attribute information to said second graphical objects in response to the detection of the movement of said pointer in the second direction to recognizably display a fifth graphical object on said display screen, and (g) a step of detecting an operator input selecting said fifth graphical object.

In the claims of this specification, the term "hierarchical attribute information" is information for specifying the hierarchical relationship between the graphical objects. The term "display attribute" as used in the claims of this specification is a concept including non-display, translucent display, highlighted display, translucent highlight display, and blink display, etc. The expression "ordered depending on graphic definition information" as used in the claims of this specification is a concept including not only ordering graphic definition information by sorting it in a reference plane but also ordering graphical objects using the graphic definition information based on a predetermined rule.

In another aspect, this invention provides a method of selecting one graphical object among a group of graphical objects displayed in a display screen based on graphic definition information of multiple graphical objects which are managed by a group relationship on a graphical objects display control apparatus having a display screen and an input device, said method comprising;

(a) a step of modifying a display attribute of a second graphical object ordered next to a first graphical object depending on said graphic definition information in response to an operator input which is classified into a first category and uses said input device, and (b) a step of modifying a display attribute of a third graphical object belonging to a group common to said second graphical object in response to an operator input which is classified into a second category which is different from said first category and uses said input device.

The term "operator input which is classified into a first (or a second) category" as used in the claims of this specification is a concept including not only the movement of the pointer on the operation tablet but also a predetermined key input and a specific mouse operation, etc.

In a further aspect, this invention provides a method of selecting one graphical object among a group of graphical objects displayed in a display screen based on graphic definition information of multiple graphical objects on a graphical objects display control apparatus having a display screen and an input device, said method comprising;

(a) a step of ordering said multiple graphical objects depending on said graphic definition information, (b) a step of modifying a display attribute of a first graphical object in response to an operator input which is classified into a first category and uses said input device, and (c) a step of modifying a display attribute of a second graphical object positioned next to said first graphical object when an operator input which is classified into said first category is detected after said step (b).

In a further aspect, this invention provides a method of selecting one graphical object among a group of graphical objects displayed in a display screen based on graphic definition information of multiple graphical objects on a graphical objects display control apparatus having a display screen and an input device, said method comprising;

(a) a step of modifying a display attribute of second graphical object ordered next to a first graphical object depending on said graphic definition information in response to an operator input which is classified into a first category and uses said input device, and (b) a step of modifying a display attribute of a third graphical object positioned next to said second graphical object when an operator input which is classified into said first category is detected after said step (a).

In a further aspect, this invention provides a graphical object display control apparatus having a display screen and an input device, said apparatus comprising;

(a) graphic definition data defining a graphical object displayed on said display screen, (b) graphical object hierarchy definition data for managing hierarchical attribute information of said graphical object, (c) a display part for displaying a group of graphical objects on said display screen, (d) a display processing part for generating an operation tablet in which is positioned a pointer which is operable by said input device, (e) a display status modifying range determination part (e-1) for modifying a display attribute of a second graphical object ordered next to a first graphical object depending on said graphic definition information in response to the detection of the movement of said pointer in the first direction, and (e-2) for modifying a display attribute of a third and a fourth graphical objects having a common hierarchical attribute information to said second graphical objects in response to the detection of the movement of said pointer in the second direction to recognizably display a fifth graphical object on said display screen, and (f) an event detection part for detecting an operator input selecting said fifth graphical object.

In a further aspect, this invention provides a graphical object display control apparatus having a display screen and an input device, said apparatus comprising;

(a) graphic definition data defining a graphical object displayed on said display screen, (b) graphical object hierarchy definition data for managing a group relationship between said graphical objects, (c) a display status modifying range determination part (c-1) for modifying a display attribute of a second graphical object ordered next to a first graphical object depending on said graphic definition information in response to an operator input which is classified into a first category and uses said input device, and (c-2) for modifying a display attribute of a third graphical object belonging to a group common to said second graphical object in response to an operator input which is classified into a second category which is different from said first category and uses said input device.

In a further aspect, this invention provides a graphical object display control apparatus having a display screen and an input device, said apparatus comprising;

(a) graphic definition data defining a graphical object displayed on said display screen, (b) a display state table generating part for ordering said multiple graphical objects depending on said graphic definition data, (c) a display status modifying range determination part (c-1) for modifying a display attribute of a first graphical object in response to an operator input which is classified into a first category and uses said input device, and thereafter (c-2) for modifying a display attribute of a second graphical object positioned next to said first graphical object when an operator input which is classified into said first category is detected.

In a further aspect, this invention provides a graphical object display control apparatus having a display screen and an input device, said apparatus comprising;

(a) graphic definition data defining a graphical object displayed on said display screen, (b) a display state modification range determination part (b-2) for modifying a display attribute of second graphical object ordered next to a first graphical object depending on said graphic definition information in response to an operator input which is classified into a first category and uses said input device, and thereafter (b-2) for modifying a display attribute of a third graphical object positioned next to said second graphical object when an operator input which is classified into said first category is detected.

In one aspect, this invention provide a recording medium for storing a program for controlling selection of one graphical object among a group of graphical objects displayed in a display screen based on graphic definition information of multiple graphical objects which are managed by hierarchical attribute information on a graphical objects display control apparatus having a display screen and an input device, said control program comprising;

(a) a program code indicating said display control apparatus to display a group of graphical objects on said display screen, (b) a program code indicating said display control apparatus to display on said display screen an operation tablet in which an operable pointer is positioned by said input device, (c) a program code indicating said display control apparatus to detect the movement of said pointer in a first direction on said operation tablet, (d) a program code indicating said display control apparatus to modify a display attribute of a second graphical object ordered next to a first graphical object depending on said graphic definition information in response to the detection of the movement of said pointer in the first direction, (e) a program code indicating said display control apparatus to detect the movement of said pointer in a second direction on said operation tablet, (f) a program code indicating said display control apparatus to modify a display attribute of a third and a fourth graphical objects having a common hierarchical attribute information to said second graphical objects in response to the detection of the movement of said pointer in the second direction to recognizably display a fifth graphical object on said display screen, and (g) a program code indicating said display control apparatus to detect an operator input selecting said fifth graphical object.

In one aspect, this invention provide a recording medium for storing a program for controlling selection of one graphical object among a group of graphical objects displayed in a display screen based on graphic definition information of multiple graphical objects which are managed by a group relationship on a graphical objects display control apparatus having a display screen and an input device, said control program comprising;

(a) a program code indicating said display control apparatus to modify a display attribute of a second graphical object ordered next to a first graphical object depending on said graphic definition information in response to an operator input which is classified into a first category and uses said input device, and (b) a program code indicating said display control apparatus to modify a display attribute of a third graphical object belonging to a group common to said second graphical object in response to an operator input which is classified into a second category which is different from said first category and uses said input device.

In one aspect, this invention provide a recording medium for storing a program for controlling selection of one graphical object among a group of graphical objects displayed in a display screen based on graphic definition information of multiple graphical objects on a graphical objects display control apparatus having a display screen and an input device, said control program comprising;

(a) a program code indicating said display control apparatus to order said multiple graphical objects depending on said graphic definition information, (b) a program code indicating said display control apparatus to modify a display attribute of a first graphical object in response to an operator input which is classified into a first category and uses said input device, and (c) a program code indicating said display control apparatus to modify a display attribute of a second graphical object positioned next to said first graphical object when an operator input which is classified into said first category is detected thereafter.

In one aspect, this invention provide a recording medium for storing a program for controlling selection of one graphical object among a group of graphical objects displayed in a display screen based on graphic definition information of multiple graphical objects on a graphical objects display control apparatus having a display screen and an input device, said control program comprising;

(a) a program code indicating said display control apparatus to modify a display attribute of second graphical object ordered next to a first graphical object depending on said graphic definition information in response to an operator input which is classified into a first category and uses said input device, and (b) a program code indicating said display control apparatus to modify a display attribute of a third graphical object positioned next to said second graphical object when an operator input which is classified into said first category is detected thereafter.

BRIEF DESCRIPTION OF THE FIGURES

The objects, features and other characteristics of the invention will be more readily understood in conjunction with the accompanying drawings in which:

FIG. 5 is a schematic chart of a graphical object hierarchy definition data in the preferred embodiment of this invention;

FIG. 13 is a graphical example showing the operation of the graphical abject display control system in the preferred embodiment of this invention;

FIG. 14 is a graphical example showing the operation of the graphical object display control system in the preferred embodiment of this invention;

FIG. 15 is a graphical example showing the operation of the graphical object display control system in the preferred embodiment of this invention;

DESCRIPTION OF THE REFERENCE NUMBERS

Figure 1:
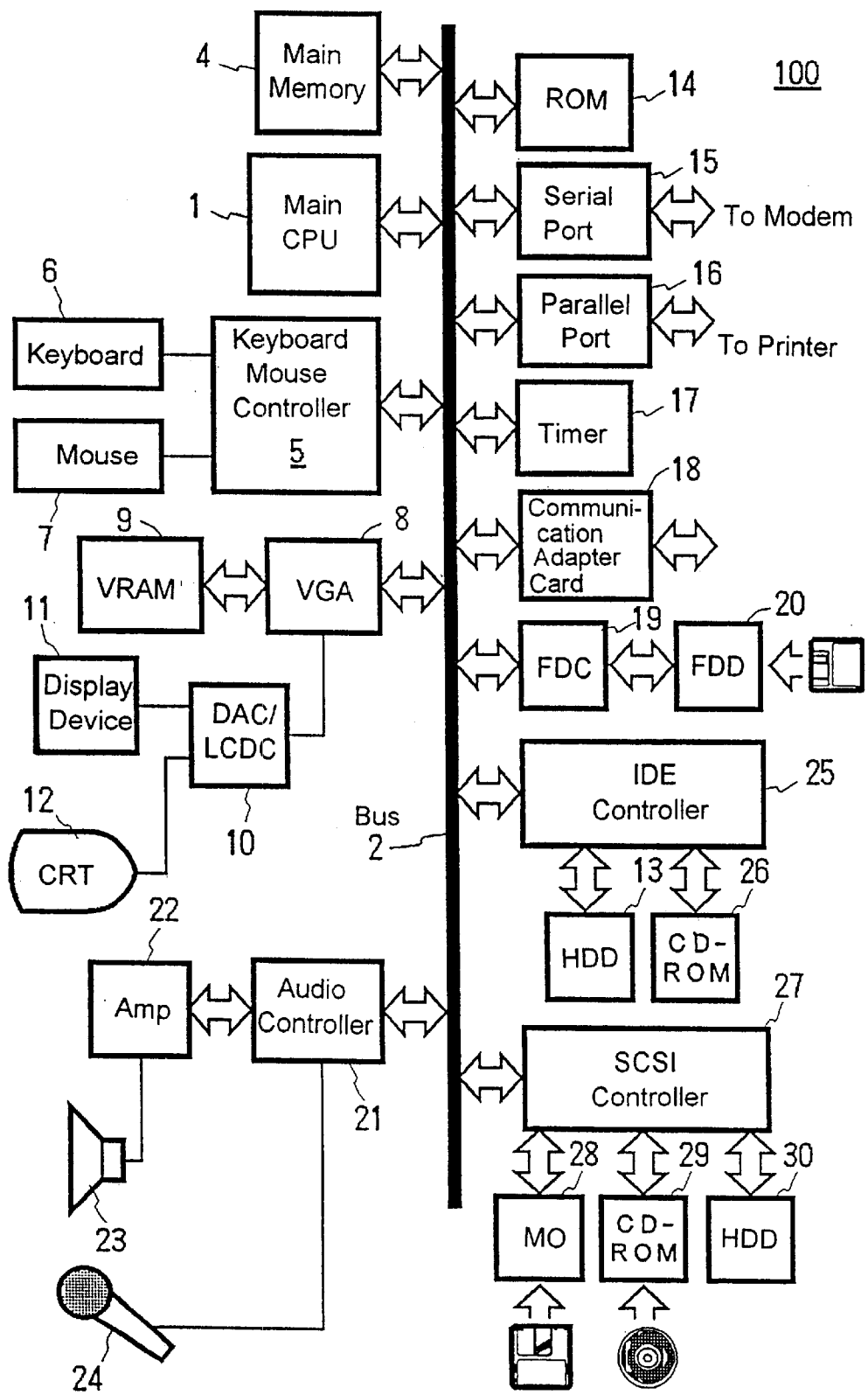
FIG. 1 is a schematic view of the hardware configuration for implementing the graphical object display control system of this invention.

100: graphical object display control system
101: graphical object definition data
103: input part
105: event detection part
106: graphical display state modification part
107: display state table preparing part
108: reference plane data
109: graphical object display state table
111: display state modification range determination part
112: state memory part
113: graphical display state determination part
115: graphical object hierarchy definition data
116: operation history stack
117: display processing part
119: display part
150: operation tablet
151: pointer
300: graphical objects

DETAILED DESCRIPTION OF THE INVENTION

A. Hardware Configuration

Referring now to the drawings, and more particularly, FIG. 1 is a schematic view of the hardware configuration for implementing the graphical object display control system 100 of this invention. The graphical object display control system 100 comprises a central processing unit (CPU) 1 and a memory 4. The CPU 1 and the memory 4 are connected to a hard disk device 13, 31 as an auxiliary storage via a bus 2 and the like. A floppy disk device (or a medium drive device 26, ,28, 29, 30 such as MO 28, a CD-ROM 26, 29) 20 is connected to the bus 2 through a floppy disk controller (or various controllers such as IDE controller 25, SCSI controller 27)19.

A floppy disk (or a recording medium such as an MO, a CD-ROM) is inserted to the floppy disk device (or a medium drive device 26, ,28, 29, 30 such as an MO, a CD-ROM) 20. A computer program code which gives instructions to the CPU and the like in cooperation with an operating system to practice this invention and various data are recorded in the floppy disk, the hard disk device 13, or a CD-ROM 14 and executed by being loaded in the memory 4. The computer program code may be compressed or divided into pieces for recording in a plurality of media.

Further, the graphical object display control system 100 may be a system which is provided with a user interface hardware including, for example, a pointing device 7 (a mouse, a joystick, and a track ball, etc.) for inputting screen position information, a keyboard 6 for supporting a key input and displays 11, 12 for presenting image data to the user. Further, a speaker 23 receives a sound signal from an audio controller 21 via an amplifier 22 for outputting as a sound.

The graphical object display control system 100 may communicate with other computers and the like via a communication adapter 18 such as a serial port 15, a modem or a token ring.

This invention may be practiced by a conventional personal computer (PC), a workstation, a computer implemented in home electric appliances such as a television set and a facsimile equipment, and a combination thereof. It should be noted, however, that these components are given for exemplary purpose and it is not meant that all of these components are the indispensable components of this invention. Particularly, because this invention is intended for controlling display of graphical object, components such as the serial port 15, the communication adapter card 18, the audio controller 21, the amplifier 22 and the speaker 23 are not indispensable for one mode of practicing this invention.

While it is desirable that the operating system is one which support as a standard a GUI multi window environment such as Windows NT (a trademark of Microsoft), Windows 95 (a trademark of Microsoft), Windows 3.x (a trademark of Microsoft), O/S2 (a trademark of International Business Machines Corporation), MacOS (trademark of Apple Corporation), and X-WINDOW system (a trademark of X Consortium) on AIX (a trademark of International Business Machines Corporation), an OS such as a real time OS including OS/Open (a trademark of International Business Machines Corporation), VxWorks (a trademark of Wind River Systems, Inc.), and Java OS may be also implemented and the operating system is not limited to any specific operating system environment.

While FIG. 1 shows a system in a stand alone environment, this invention may be implemented as a client/server system in which a client machine may be LAN connected by an Ethernet or a token ring, etc., and the server machine side may be provided with graphic definition data to be described later with other functions ordered in the client machine side. As such, it is a matter of choice on design to dispose what function in the server machine side and the client machine side and various modifications including combination of multiple machines and allocation of functions to them for implementation are within the concept included in the spirit of this invention.

B. System Configuration

The system configuration of this invention is now described with reference to the block diagram of FIG. 2. In the preferred embodiment of this invention, the graphical object display control system 100 comprises graphic definition data 101, an input part 103, an event detection part 105, a graphical display status modification part 106, a display status table generating part 107, reference plane data 108, a graphical object display status table 109, a display status modification range determination part 111, a status memory part 112, a graphical display status decision part 113, graphical object hierarchy definition data 115, an operation history stack 116, a display processing part 117 and a display part 119.

Figures 3, 4, 6:
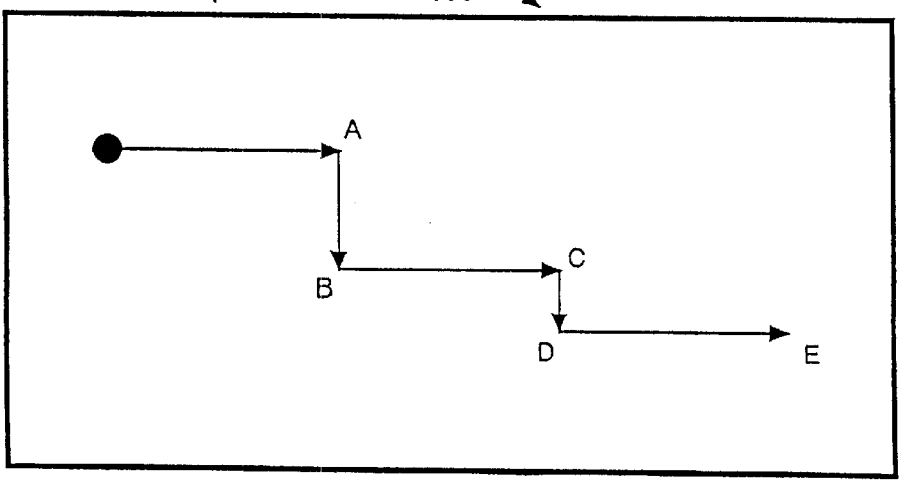
FIG. 3 is a managing table of graphic definition data in the preferred embodiment of this invention.
FIG. 4 shows a schematic chart of a chart of the graphical object display state table 109.
FIG. 6 is a diagram showing the operation tablet in the preferred embodiment of this invention.
Figure 7:
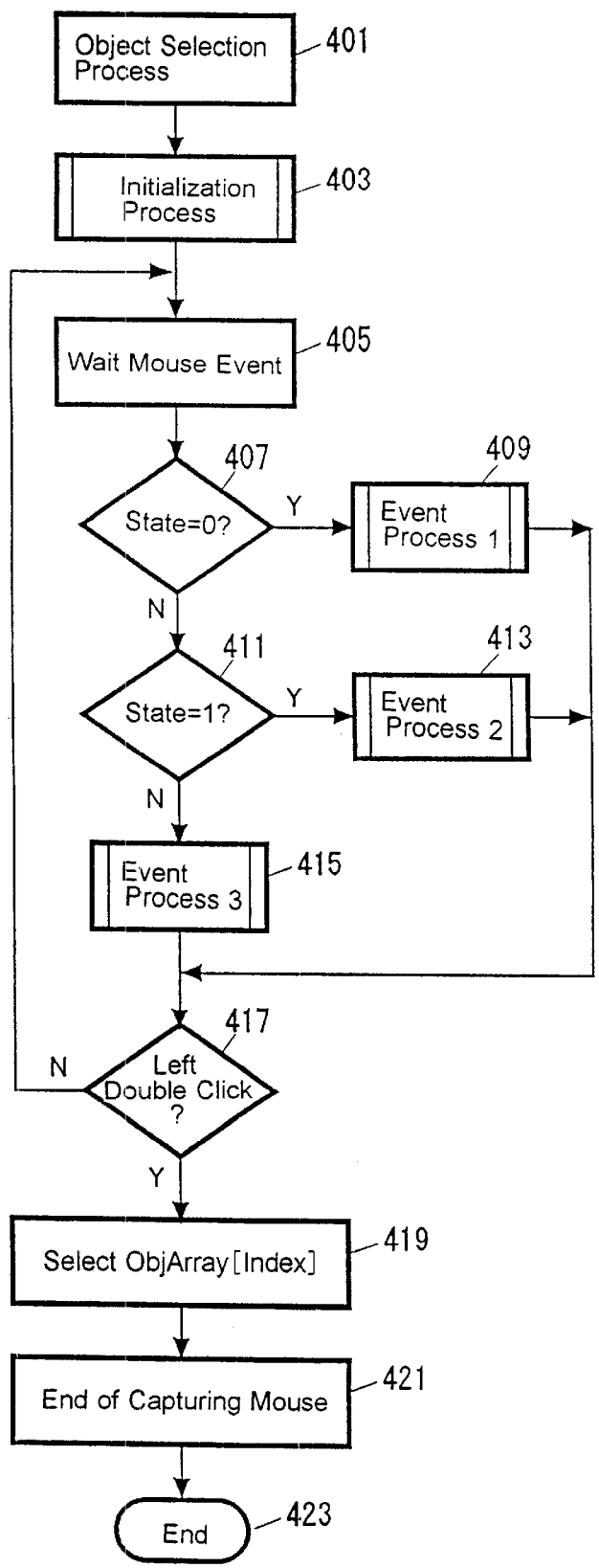
FIG. 7 is a flow chart showing the operation of the graphical object display control system in the preferred embodiment of this invention.

The graphic definition data 101 is information for defining the shape and the like of each graphical object. FIG. 3 shows a managing table of graphic definition data in the preferred embodiment of this invention. The graphic definition data 101 is managed by an object name 201.

The input part 103 receives an input from input devices such as a pointing device and a keyboard and delivers it to the event detection part 105. The event detection part 105 determines the content of the input information delivered from the input part 103. The graphical display status modification part 106 modifies various parameters such as modification of a view point coordinate value, modification of magnification and modification of the reference plane data to be described later, etc., corresponding to modification of the display status (zoom, rotation, etc.) of graphical object (group) based on operator's operation.

The display status table generating part 107 sorts the content of a graphical object display status table to be described later in the direction of the depth with respect to the reference plane 108 (normal direction) within the display space. While the reference plane is set in an initial state, that is, in a plane parallel to the display screen with a view point of a virtual camera being a normal and vertical within the display space, the normal of the reference plane may be set in a different position from the view point. In such case, processing of a graphical object can be set in a desired direction (from the right side of the screen, for example).

The graphical object display status table 109 is a table for controlling the display attribute of graphical objects. The content of the table is sorted in the direction of the depth (normal direction) with respect to the current reference plane 108. In the preferred embodiment of this invention, graphical objects are mostly displayed in 4 modes including a normal display, non-display, a translucent display and translucent highlighted display.

FIG. 4 shows a chart of the graphical object display status table 109. As shown in FIG. 4, the graphical object display status table 109 is managed for each graphical object and manages items of an index 211, a depth display attribute 213, a hierarchy display attribute 215, a highlight attribute 217 and a pointer 219. The pointer 219 points to a corresponding object of the graphic definition data 101.

The depth attribute 213 and the hierarchy display attribute 215 manage a flag which controls whether to normally display or non-display the graphical object. The highlight attribute 217 manages a flag which controls whether to highlight display (highlight translucent display) the graphical object or not. The pointer 219 manages pointer information for accessing to definition data of a graphical object.

The display status modification range determination part 111 updates a flag (depth display attribute 213, hierarchy display attribute 215, highlight attribute 217) of the graphical object display status table 109 depending on the content of an event based on an operator's input in each status such as a normal direction scanning state and a hierarchy group scanning state to be described later. It also controls the state and generates an operation tablet and an operation stack, etc., to be described later.

The graphical display status decision part 113 determines a graphical object of which a display state is to be changed as determined by the content of the graphical object display status table 109 and the display state thereof. Incidentally, in the preferred embodiment of this invention, a graphical object is highlight displayed when the highlight attribute 217 is true, normal-displayed when the highlight attribute is false and both the depth display attribute and the hierarchy display attribute are true, and not displayed otherwise. A graphical object hiding at least a part of an object of a highlight attribute is displayed in translucence even when it is a graphical object of a normal-display.

The graphical object hierarchy definition data 115 manages a hierarchical relationship among graphical objects as shown in FIG. 5. The operation history stack 116 is a stack for recording an operation history. In the preferred embodiment of this invention, a current position of the pointer (X, Y), a reference point of the pointer (OLDX, OLDY), an Index value for specifying a graphical object currently under processing, and information of the graphical object display status table 109 are stored in the stack as elements.

The display processing part 117 extracts a graphical object to be displayed from the graphic definition data 101 based on information of an object to be displayed which is delivered from the graphical display state decision part 113 and the display attribute thereof to generate image data. The display part 119 displays a graphical object and a tablet on the display screen based on the image data delivered from the display processing part 117.

Figure 2:
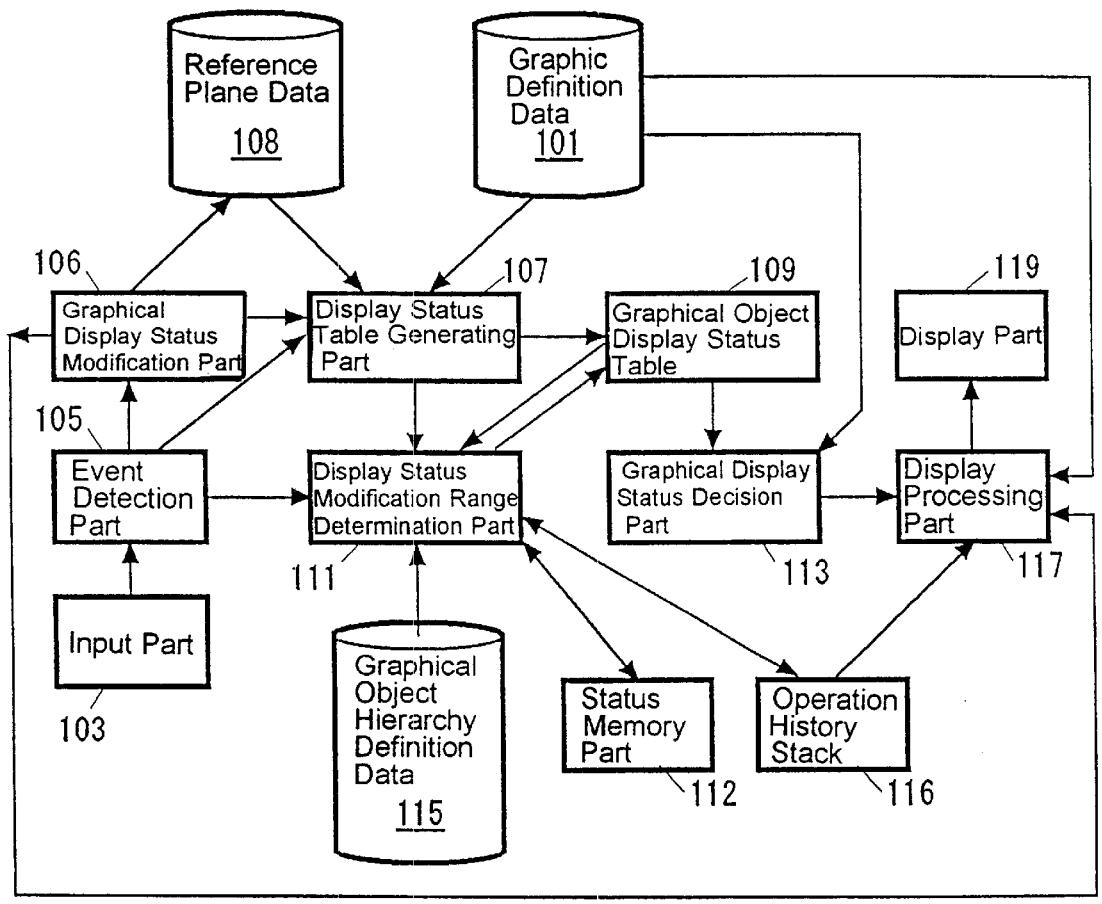
FIG. 2 is a block diagram of processing components.

While the functional blocks shown in FIG. 2 have been described, they are logical functional blocks and it is not meant that they are implemented in the form of independent hardwares or softwares. They may be implemented by a complex or shared hardware or software.

C. Description of Operation

C-1. Summary of User Operation

A user performs the following operations to select an object hidden behind another object on the display by a mouse operation from a screen of 3 dimensional display.

(1) Move a mouse pointer to a suitable position on the screen and click it to display an operation tablet (a transparent 2 dimensional frame and point as shown in FIG. 6, for example). In the preferred embodiment of this invention, operations for the operation tablet include the following 3 states to discriminate processing of mouse events.

a state for sensing a horizontal movement (state 0: normal direction scanning state)

a state for sensing a vertical movement (state 1: hierarchy group scanning state)

interruption state of tablet operation (state 2: state in which tablet operation is interrupted)

(2) Operate the mouse horizontally on the operation tablet to move the plane of the display space from the fore side to the depth direction. A graphical object positioned in fore side of the plane is deleted object by object, or the display attribute is changed to reveal a graphical object hiding behind the fore ground. Also, by moving vertically, an object is deleted along with a specific group to which that object belongs, or the display attribute is changed.

The state is switched among the states 0 to 2 by a mouse click or a keyboard operation. While an event is captured during the operation, the capture is released by shifting to the state 2. Therefore, a mouse operation can be effected temporarily in another window so that both the change of the display attribute by the operation tablet and a screen operation such as zooming on the 3 D browser main window can be effected.

(3) Double click a desired graphical object revealed by such operation directly on the screen to select it.

C-2 Processing Flow of the Invention

The operation of the processing elements of the preferred embodiment of this invention corresponding to these user's operations is now described using the flow is chart of FIG. 7 to FIG. 12.

(1) Display of Control (Initialization process)

When the operator clicks the mouse on the screen (or a window of a graphic software) (block 401), the event detection part 105 detects it. The graphical object display control system 100 performs an initialization process in response thereto (block 403). The initialization process may be performed in response to the start of the graphic software and designation of an object (group) to be displayed.

Figure 8:
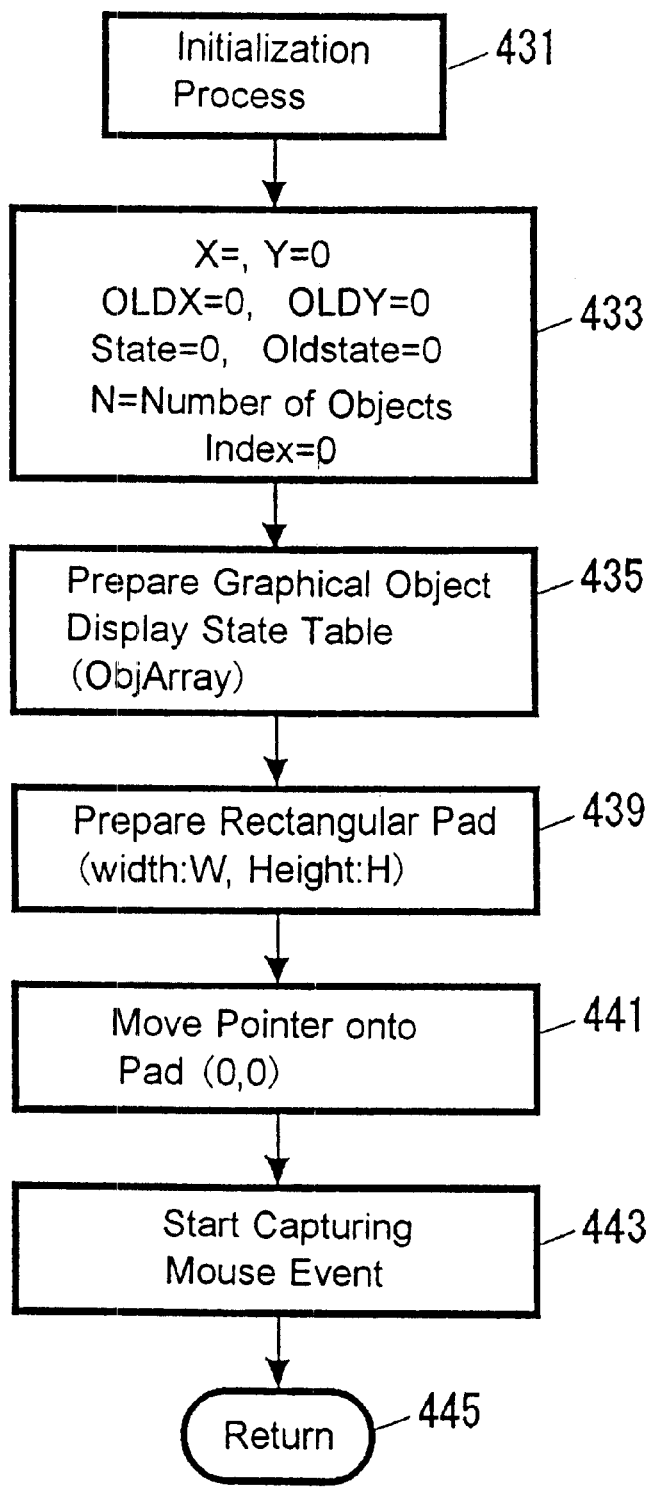
FIG. 8 is a flow chart showing the operation of the graphical object display control system in the preferred embodiment of this invention.

FIG. 8 is a flow chart showing the procedure of the initialization in the preferred embodiment of this invention. The graphical object display control system 100 initializes parameters first of all (block 433). Particularly, they are the position of the pointer (X, Y), the old position of the pointer (OLDX, OLDY), the state (State), the immediately preceding state (OLDstate). An object name 201 is taken out from the graphic definition data 101 and is set in the graphical object display state table 109. At the same time, a pointer to the object definition data 203 is set in the pointer 219.

The flags of the depth display attribute 213 and the hierarchy display attribute 215 of all graphical objects are then set to 1 and the highlight attribute 217 is set to 0. When a graphical object is hidden behind another (or its own) graphical object, the graphical object display control system 100 in the preferred embodiment of this invention causes that graphical object to be not displayed by a known hidden face removal technique.

The display state table generating part 107 then refers to the graphic definition data 203 of each graphical object to scan the display space in the depth direction (normal direction) of the current reference plane (a plane which is in parallel with the screen and perpendicular in the display space in the initial state) 108. By scanning, the graphical objects are sorted by the distance from the fore side of the screen to generate the graphical object display state table 109 (block 435).

A rectangular pad (operation tablet 150) is generated on the screen (block 439) and the pointer is moved to the origin point of the operation tablet (block 441) to initiate capturing the mouse event (block 443). The contiguous values of the amount of movement which are detected by the operation tablet are correlated to the depth of the displayed objects from the fore side of the screen. While the depth value is measured by the distance of an actual graphical object in the normal direction in the preferred embodiment of this invention, the order of graphical objects in sorting may be used as the depth. An icon to initialize the graphic software is provided in the preferred embodiment of this invention and an initialization routine is executed when this icon is clicked.

With reference to FIG. 7 again, mainly 3 kinds of modes are designated by the operator's mouse operation in the preferred embodiment of this invention.

They are:

a state for sensing a horizontal movement (state=0): hereinafter referred to "normal direction scanning state"

a state for sensing a vertical movement (state=1): hereinafter referred to "hierarchy group scanning state"

tablet operation interruption state (state=2): hereinafter referred to "tablet operation interrupted state"

In the initial state, the normal direction scanning state (state=0) is set (FIG. 8, block 433). By a mouse clicking or a keyboard operation, the 3 states 0 to 2 are alternated one another. While an event is captured during the operation, the capture is released by shifting to the state 2. Therefore, a mouse operation can be effected temporarily in another window so that both the change of the display attribute by the operation tablet and a screen operation such as zooming on the main window of the 3 D browser (graphic software) can be effected.

Figure 9:
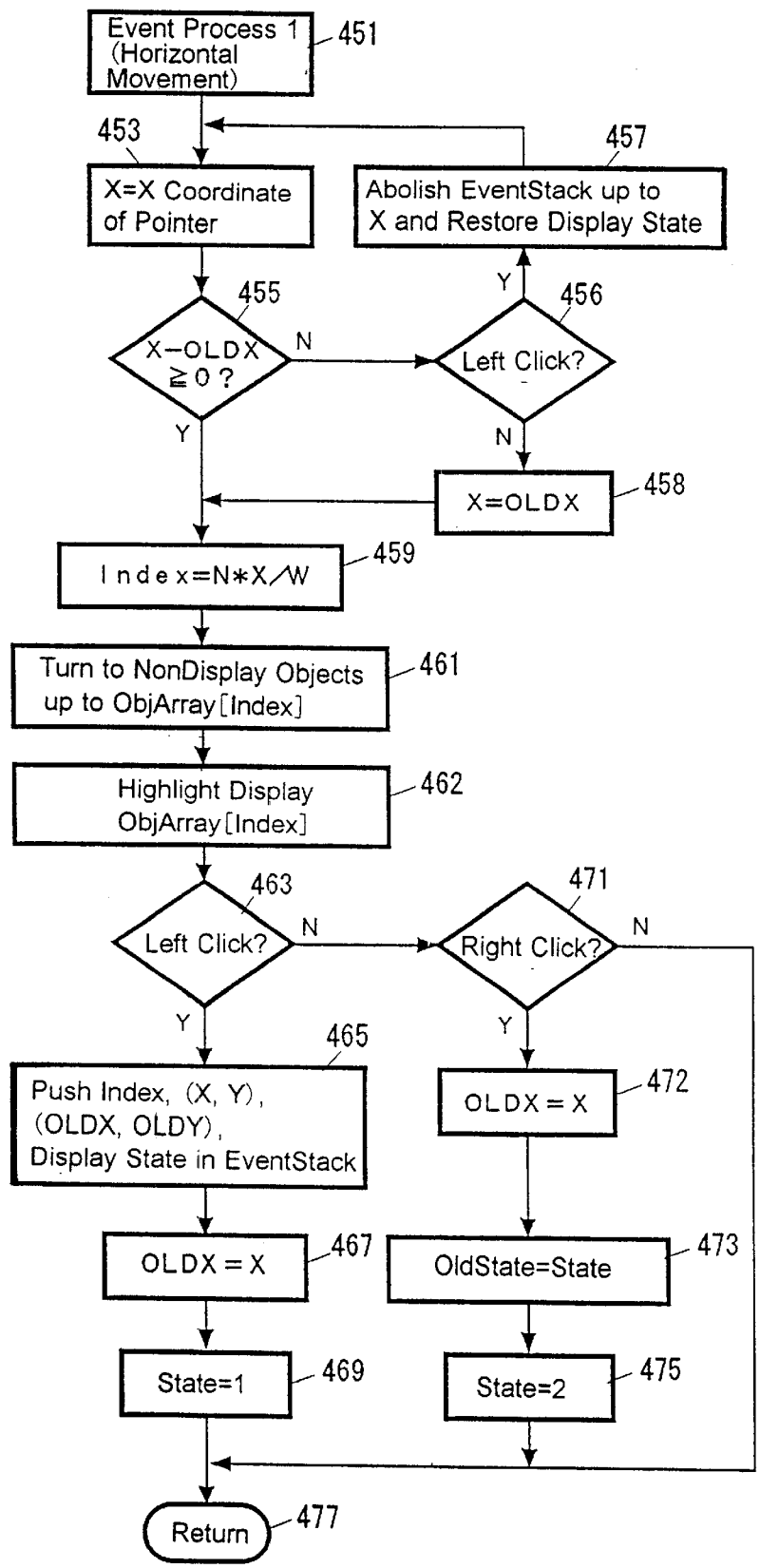
FIG. 9 is a flow chart showing the operation of the graphical object display control system in the preferred embodiment of this invention.

FIG. 9 is a flow chart showing the processing procedure in the normal direction scanning state in the preferred embodiment of this invention. In FIG. 9, processing starts at the block 451. First of all, the movement of the mouse is detected by the event detection part 105 and the current coordinate value of the mouse pointer is delivered to the display state modification range determination part 111 (block 453) which then determines whether or not the mouse pointer is moved to the right (block 455).

If the mouse pointer is not moved to the right, it is further determined whether or not a left clicking is generated (block 456). This is an operation to recover the operation which the operator has so far effected to the point of time designated by the left clicking. When it is determined that the left clicking is generated, a stack which has an X coordinate value larger than the position where the left clicking was generated, which is stored in the operation history stack 116, is erased and information of the graphical object display state table which is stored in the top of the stack (which has a maximum X coordinate value at this point of time) is written back to the graphical object display state table 109 (block 457). When the left clicking is not generated, X remains set to the value of OLDX (block 458).

When the mouse pointer is moved to the right or when the mouse pointer is moved to the left without a left clicking being generated, an index value corresponding to the amount of the movement is calculated (block 459). The display state modification range determination part 111 then updates the values of the depth display attribute and the highlight attribute up to the calculated index value to "0" in the graphical object display state table 109, and switches the object to non-display (block 461). It also updates the value of the highlight attribute 217 of the object of the calculated index value to "1" (block 462). By this operation, an object which lies in fore side of the desired object is removed to highlight display the currently focused graphical object.

In the preferred embodiment of this invention, because the depth value is measured by the distance in the normal direction of an actual graphical object, a sufficient precision may not occasionally be obtained to finely tune the depth of a cross section by a GUI when very many objects are displayed so that the aimed object may not be well tuned in a visually recognizable state.

In such case, the range to be controlled is narrowed down (to close up the area around the pointer position in the operation tablet 150 which is current operated upon) so as to enable a more fine tuning in a narrow range. Conversely, the range of control is expanded so as to allow a wide area to be erased efficiently by a small movement of the mouse. The tuning of resolution may be done by various methods including provision of a GUI button and triggering by a mouse clicking.

When clicking of the left button is detected (block 463), the current pointer position (X, Y), the pointer reference point (OLDX, OLDY), an Index value for specifying the graphical object currently under processing, and information of the graphical object display state table 109 are stacked in the operation history stack (block 465), the place where the clicking takes place becomes the coordinate of a new reference point (the value of X is saved in OLDX, block 467), and the state is shifted to the hierarchy group scanning state (block 469).

When clicking of the right button is detected (block 471), the current pointer position is saved (block 472) and capture of the event is terminated. In addition, the state 0 is recorded in a buffer 112 (block 473) and the state is shifted to the tablet operation interrupted state (block 475).

Figure 10:
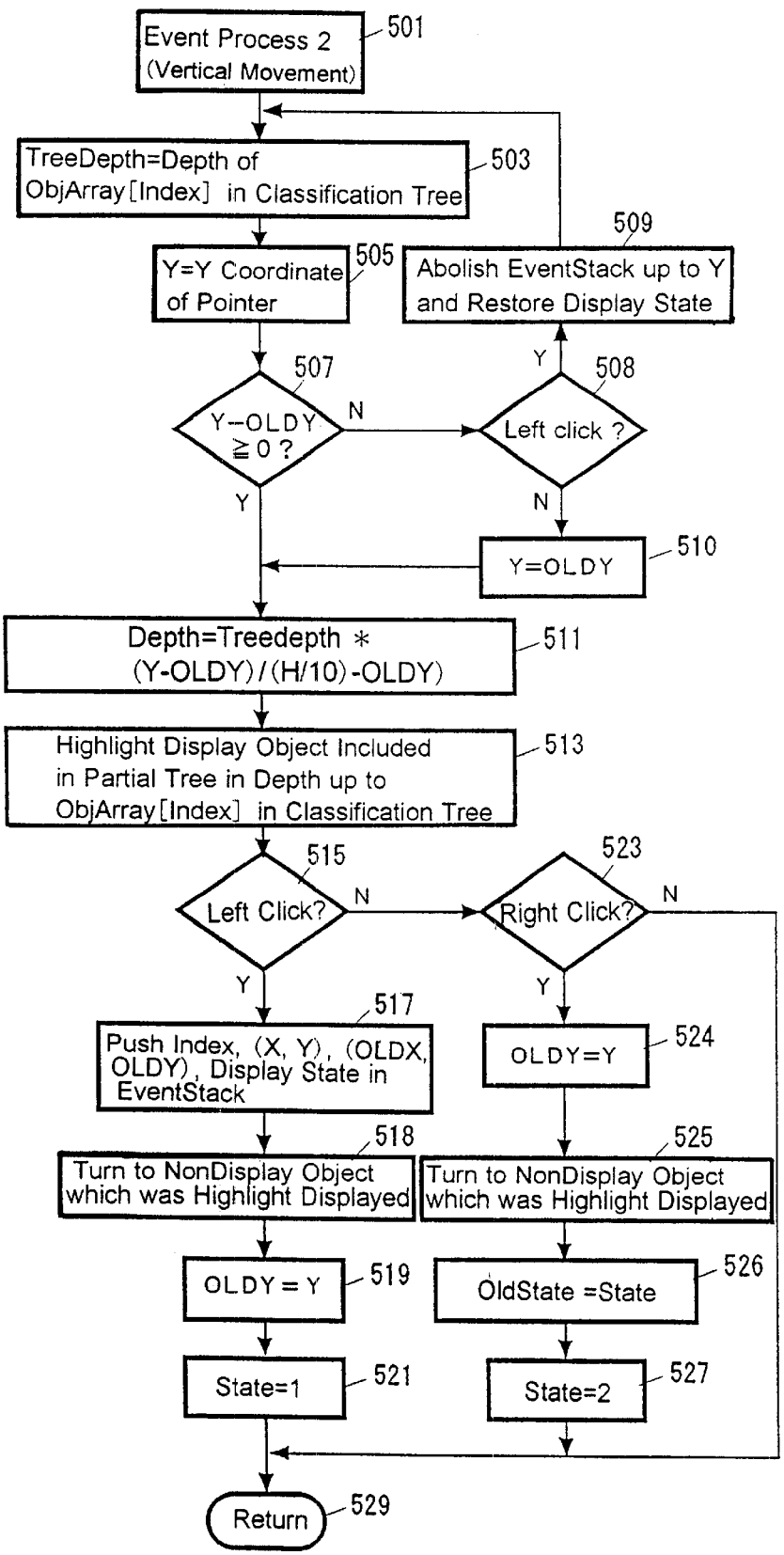
FIG. 10 is a flow chart showing the operation of the graphical object display control system in the preferred embodiment of this invention.

FIG. 10 is a flow chart showing the processing procedure in the hierarchy group scanning state in the preferred embodiment of this invention. In FIG. 10, processing starts at the block 501. First of all, the depth of the hierarchy of the currently focused graphical object is searched (block 503). Then, the movement of the mouse is detected by the event detection part 105 and the current coordinate value of the mouse pointer is delivered to the display state modification range determination part 111 (block 505). The display state modification range determination part 111 then determines whether or not the mouse pointer is moved downwardly (block 507).

When the mouse pointer was not moved downwardly, it is further determined whether or not a left clicking was generated (block 508). This is an operation for recovering the operation which the operator has so far effected to the point of time which was designated by the left clicking.

When it is determined that the left clicking is generated, a stack which has an Y coordinate value larger than the position where the left clicking was generated, which is stored in the operation history stack 116, is erased and information of the graphical object display state table which is stored in the top of the stack (which has a maximum Y coordinate value at this point of time) is written back to the graphical object display state table 109 (block 509).

When the mouse pointer is moved downwardly, the hierarchy of the corresponding classification tree is determined depending on the displacement (positive in the downward direction) from the vertical reference point. The corresponding hierarchy is referenced to the lowest layer of the classification tree to which a highlight displayed part currently lying foremost belongs (block 51). The hierarchy crimes up the classification tree as the mouse pointer is displaced and a visual part belonging to the category of the classification tree at that point of time is highlight displayed (block 513).

Particularly, the display state modification range determination part 111 searches a graphical object from the graphical object hierarchy definition data 115 to determine the depth of the hierarchy of that graphical object. The display state modification range determination part 111 then calculates a hierarchy value for converting to non-display corresponding to the displacement of Y.

In the preferred embodiment of this invention, the operation of the hierarchy group scanning state is supposed to be done within 10 times and detects how much displacement takes place in y direction within one tenth of displacement range H of the operation tablet 150 and detects a hierarchy value (natural number) corresponding thereto. In the preferred embodiment of this invention, when TreeDepth< Depth, downward movement of the pointer is inhibited and an alarm is generated to indicate the operator that an invalid operation is done.

Then, the highlight attribute of the graphical object display state table 109 of the graphical object specified corresponding to the hierarchy value is set to "1". Specifically, assuming that the focused graphical object (having an index value) is 2.2.3.5 rocker arm 131 in FIG. 5, "2.2.3.1" to "2.2.3.5" positioned below "2.2.3" are highlight displayed when the hierarchy value is "1" while "2.2.1" to "2.2.4" positioned below "2.2" and graphical objects lower than them are highlight displayed when the hierarchy value is "2".

Referring again to FIG. 10, when clicking of the left button is detected next (block 515), the current pointer position (X, Y), the pointer reference point (OLDX, OLDY), the Index value for specifying the graphical object currently under processing, and information of the graphical object display state table 109 at that point of time are stacked in the operation history stack (block 517).

By updating all entries of the graphical object display state table 109 in which the highlight attribute are set to "1" to "0" and updating the hierarchy display attribute of the objects to "0", the graphical objects highlight displayed are changed to non-display (block 518). The y value is then saved (block 519) and the state is shifted to the normal direction scanning state (block 521).

When clicking of the right button is detected (block 523), the Y value is saved, the highlight attributes of the graphical object display state table 109 are all updated to "0" and the hierarchy display attributes of the objects are updated to "0" to change the highlight displayed graphical objects to non-display (block 525). The state 1 is recorded in the buffer 112 (block 526), capture of the event is terminated and the state is shifted to the tablet operation interrupted state (block 527).

Figure 11:
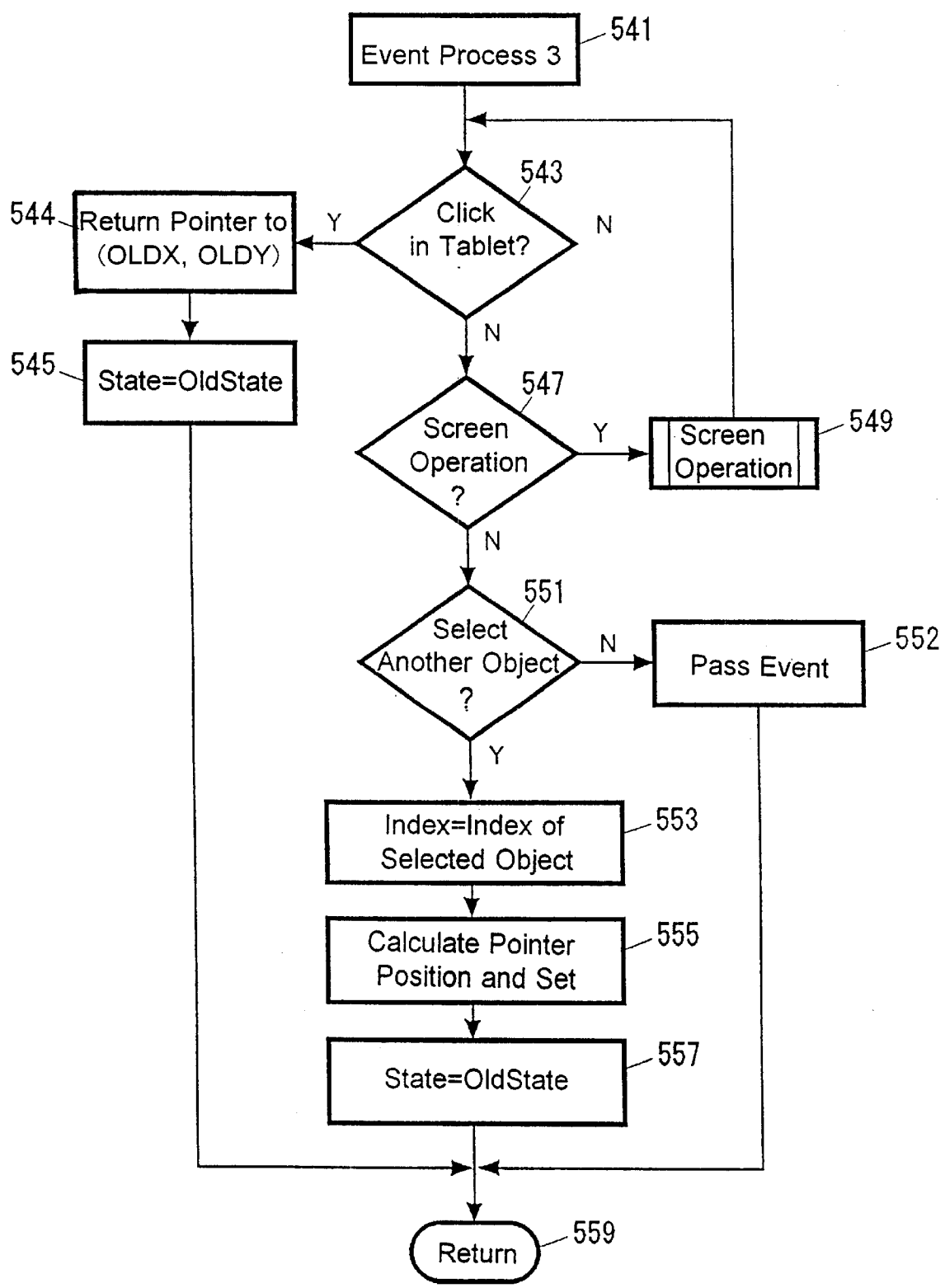
FIG. 11 is a flow chart showing the operation of the graphical object display control system in the preferred embodiment of this invention.

FIG. 11 is a flow chart showing the processing procedure in the tablet operation interrupted state in the preferred embodiment of this invention. In FIG. 11, processing starts at the block 541. First of all, the vent detection part 105 determines whether or not a left clicking or a right clicking is generated in the tablet (block 543). When it is determined that a clicking is generated in the tablet, the pointer is restored to the position at the time when the interruption is generated and the state is returned to the state before the tablet operation was interrupted, resuming capturing the event (block 545).

When it is determined that clicking is not generated in the tablet, it is further determined whether or not an event of screen operation such as zooming and rotation of a graphical image (block 547) is generated. When it is determined that there is an event of screen operation, a screen operation routine in executed (block 549).

When it is determined that an event of screen operation is not generated, it is further determined whether or not another object is selected on the browser (block 551). When it is determined that another object is not selected on the browser, the event is passed (block 552). At this point of time, any graphical object currently displayed on the browser can be selected by double clicking.

When double clicking of the mouse is detected, the browser of the preferred embodiment of this invention recognizes that a graphical object lying foremost on the normal at the clicked position is selected among those having both the depth display attribute and the hierarchy display attribute set to "1".

When it is determined that another object is selected on the browser, the index value of the selected object is set to the value of the index and the highlight attribute 217 of that object is changed to "1" (block 553). Also, the x value corresponding to that index value is calculated and the pointer is moved to that position (block 555). Further, the state is restored to the original state (block 557).

Figure 12:
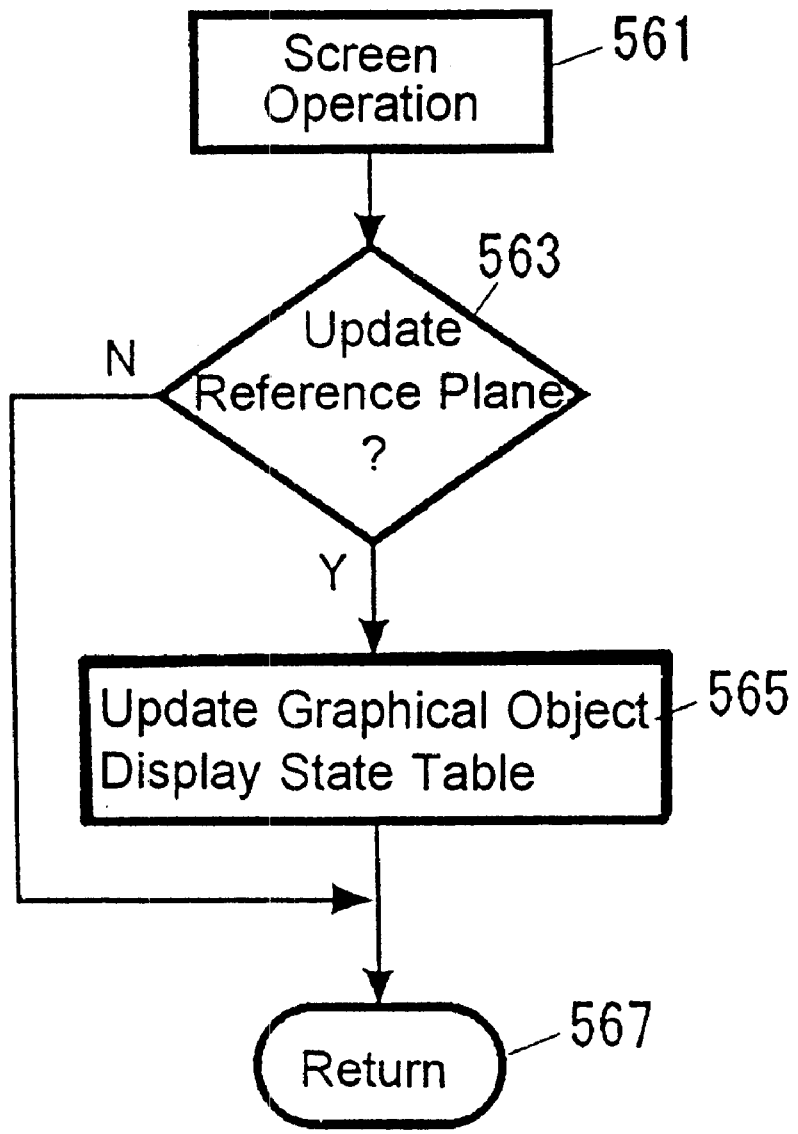
FIG. 12 is a flow chart showing the operation of the graphical object display control system in the preferred embodiment of this invention.

FIG. 12 is a flow chart showing the processing procedure when a screen operation is generated in the preferred embodiment of this invention. The operator may want to rotate or zoom up a graphical object (group) depending on the subject of the object to be displayed. In such case, the orientation of a plane is changed and the depth of each object is changed accordingly. Therefore, it is determined whether or not the reference plane is changed when a screen operation is effected (block 563) and, when it is changed, scanning is effected by a new plane, and the group of objects displayed are sorted in the depth direction and reassigned to the control (block 565).

Returning again to FIG. 7, it is determined whether or not double clicking of the mouse is detected in the tablet operation interrupted state (block 417). In the preferred embodiment of this invention, a graphical object may be selected by directly clicking on the screen a desired graphical object tuned in a visually recognizable state in the tablet operation interrupted state but a graphical object currently highlight displayed may be also selected by double clicking on the operation tablet (block 419). In the preferred embodiment of this invention, when double clicking is generated on the operation tablet 150 in a state where a plurality of graphical objects are highlight displayed, a plurality of graphical objects will be simultaneously selected.

At this time, display state modification range determination part 111 internally saves the name of this graphical object and changes the highlight attribute of the a graphical object display state table 109 of that graphical object to "1". When double clicking of the mouse is not detected, the next event is waited (block 405).

Depending on the state of the selected graphical object, objects impeding an object from being identified may hide a part (or most) of the aimed object. In such case, by reversing the direction of measuring the depth D and providing a measure for sliding the plane from the depth of the screen to the fore side, objects positioned in the furthest depth are successively changed to invisible state. For example, by providing 2 planes and combining a measure for sliding the plane from the fore side of the screen to the depth with a measure for sliding the plane from the depth of the screen to the fore side, a state in which only the area around an intended object rises up on the screen can be easily prepared.

By continuing selection while repeating the above steps, a plurality of hidden objects positioned in differing depths can be selected.

D. Embodiment

The embodiment of this invention is shown below by taking display of automobile parts for example. It is assumed here to locate and select a "rocker arm" from a 3 D model of an entire automobile which comprises several thousands parts. The rocker arm is a part which is inside an engine section and can not be simply selected when considering the depth of the position of this part from the surface of the body as measured in the whole automobile and the complexity of the engine section. In addition, because the actual user typically is not the designer of this part, the user does not know the precise name of the rocker arm which is usually identified by a complex name.

It is also assumed that a hierarchical structure as shown in FIG. 5 is defined as a parts list of an automobile considered (note that parts (graphical objects) are omitted in most hierarchies in FIG. 5 for the convenience of explanation). According to the parts list of the automobile as shown in this figure, the "rocker arm" is classified as an item of the lowest hierarchy of the hierarchical structure comprising "exhaust valve unit"—"valves"—"engine".

Taking selection of the "rocker arm" as an example, a "method using a combination of vertical and horizontal operations" and a "method using only horizontal operation" are shown below.

D-1. Method using a Combination of Vertical and Horizontal Operations

O (Initial state): As shown in FIG. 13, graphical objects 300 are displayed on the display screen based on graphic definition information of each graphical object by a known graphics display technology.

O-A (Normal direction scanning state): As shown in FIG. 14, when the procedure of this invention is started, the operation tablet 150 is generated and displayed on the display screen. The pointer 252 is then moved to the right. Along with the horizontal movement, the foremost part becomes the subject to be erased one after another among those which are in visible state and is highlight displayed while the category of the top level including the all parts were in visible state in the initial state.

In the preferred embodiment of this invention, not only the graphical object currently focused is highlight displayed but also the hiding objects are translucent highlight displayed visibly. By doing so, the operator can recognize the state in which the currently focused graphical object is changed to non-display so that selection of the graphical objects is more efficient. In this example, the operator left clicks the mouse at A when a bumper 301 which is one of the body parts is foremost and in a translucent highlight state.

A-B (Hierarchy group scanning state): As shown in FIG. 15, along with vertical movement of the pointer 151, parts can be selected as the subject of erasure group by group of a category higher than the category to which the foremost part belongs while only the foremost body part (bumper 301 in this example) was the subject of erasure initially. As shown in FIG. 15, by moving the pointer to a longer extent vertically, all parts included in the category "body" 303 which is the top level category to which the bumper 301 belongs becomes the subject of erasure. In a position B, all parts included in the "body" 303 are in the translucent highlight state in which the "engine" is visible.

Figure 16:
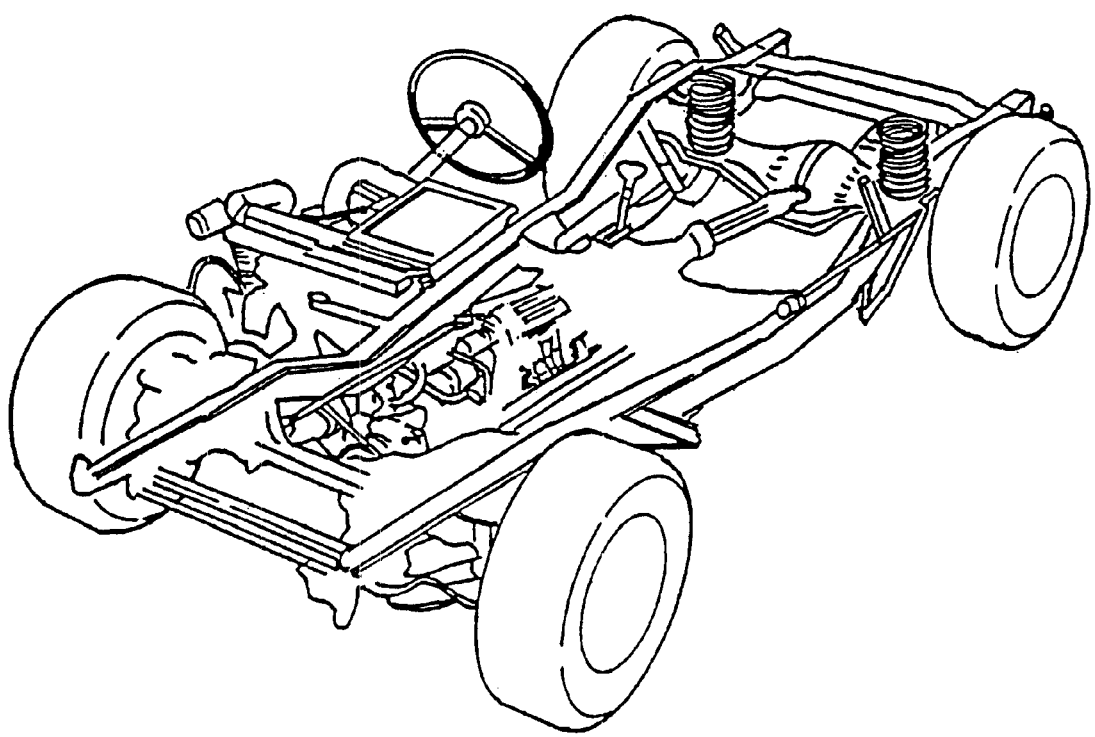
FIG. 16 is a graphical example showing the operation of the graphical object display control system in the preferred embodiment of this invention.

When the operator left clicks the mouse in the position B, the "body" 303 which was displayed in the translucent highlight state is entirely erased to reveal the "engine" to a directly visible state as shown in FIG. 16. When the operator right clicks at this point to shift to the tablet operation interrupted state, the mouse can be moved to the main window of the 3 D browser. The operator then makes the "engine" zoomed up using the function of the 3 D browser, return the mouse to the operation tablet again, and left clicks the mouse to return to the operation in the tablet.

Figure 17:
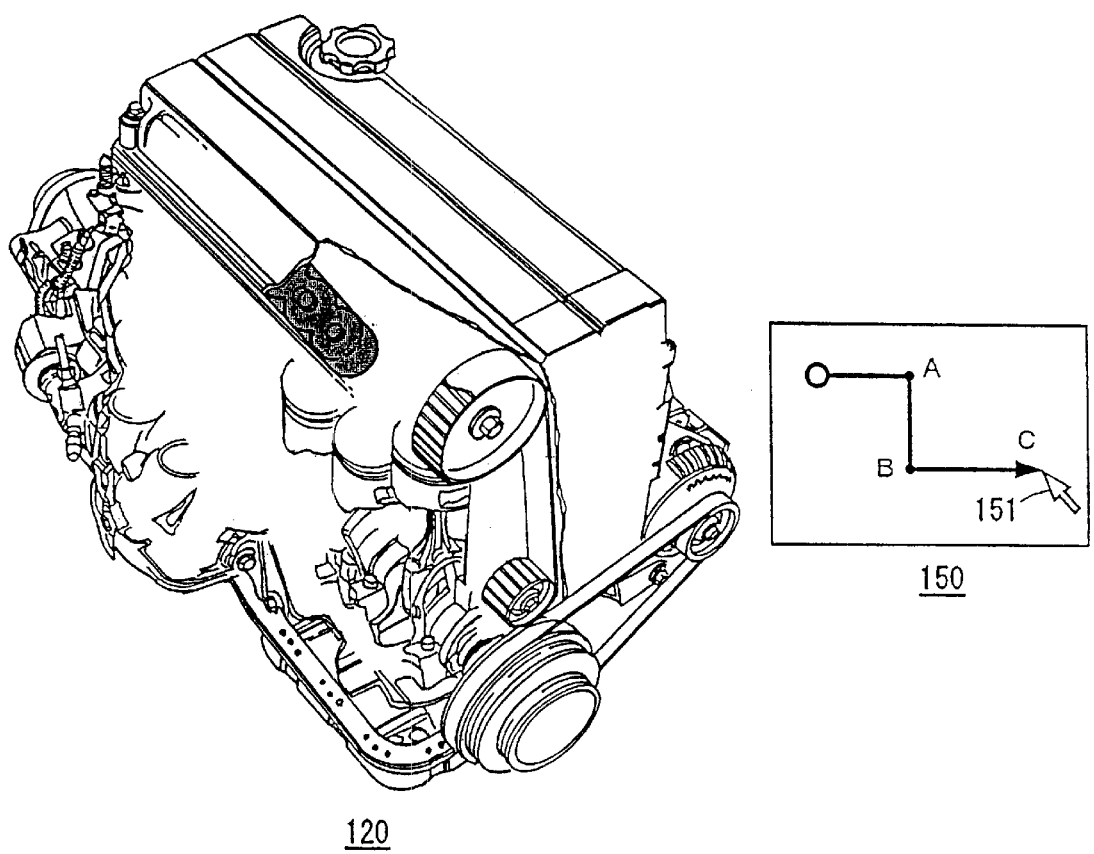
FIG. 17 is a graphical example showing the operation of the graphical object display control system in the preferred embodiment of this invention.

B-C (Normal direction scanning state): In FIG. 17, only the parts included in the category other than the "body" 303 are in a visible state with the "engine" section zoomed up. Along with horizontal movement in the operation tablet, parts of the engine become invisible and disappear one after another from the fore side. In this figure, in the state where a part lying foremost among parts surrounding the engine becomes the translucent highlight state as a subject of erasure, the mouse is left clicked at a position C to shift to the hierarchy group scanning state.

C-D (Hierarchy group scanning state): Along with vertical movement, graphical objects belonging to the category higher than the category to which this part belongs become the subject of erasure and one of the parts surrounding the engine which lies foremost becomes the translucent highlight display state first of all. Then, along with downward movement of the pointer 151, all the parts surrounding the engine become the translucent highlight display state. In the figure, when only the part included in a engine cover section forming the surface of the engine is in the translucent highlight display state, the mouse is left clicked at a position D. By this operation, all the parts of the engine cover section are erased to reveal the inside of the engine.

Thereafter, the state is shifted to the tablet operation interrupted state by right clicking the mouse at this point. The operator operates the main window of the 3 D browser to zoom up the area around the "valves" which includes the targeted rocker arm. The operator then returns the mouse to the operation tablet 150 again and left clicks to return to the operation on the tablet.

Figure 18:
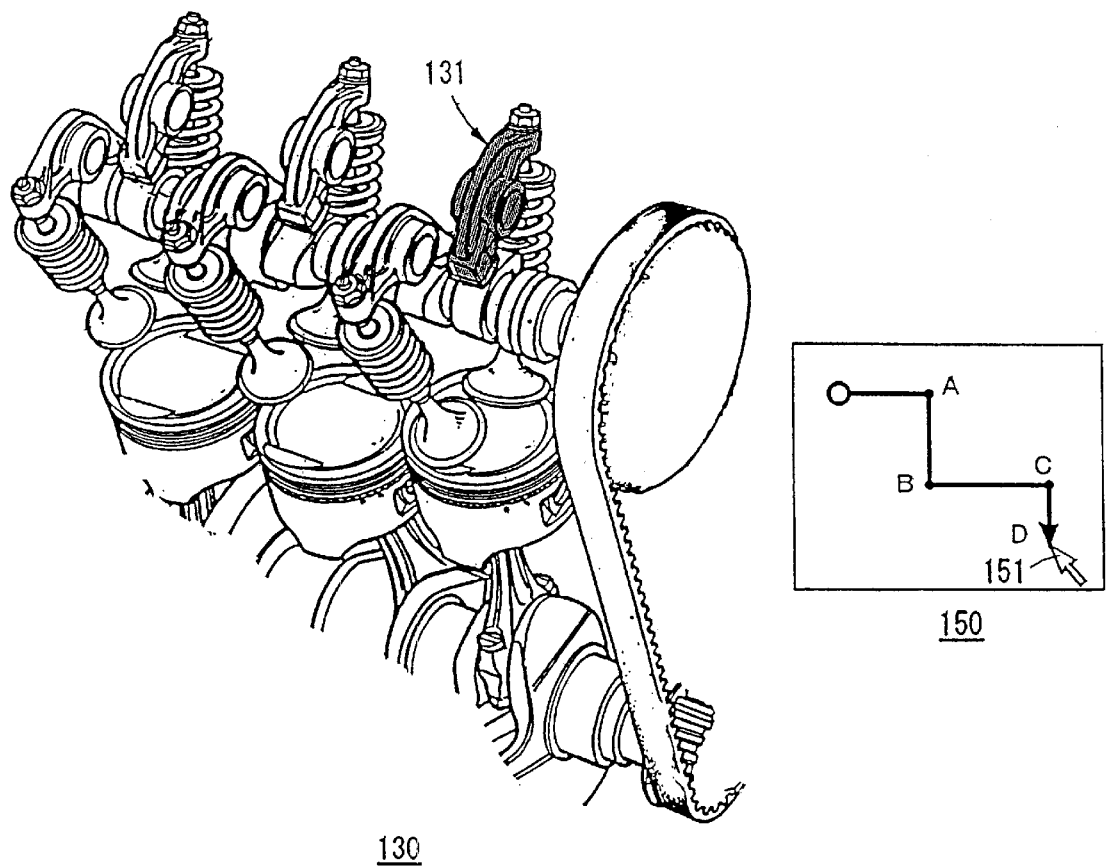
FIG. 18 is a graphical example showing the operation of the graphical object display control system in the preferred embodiment of this invention.

D-E: (Normal direction scanning state): As shown in FIG. 18, the display on the browser is shifted to a state in which parts comprising the valves are mainly visible by operator's operation and the number of the parts is considerably reduced. Along with horizontal movement after the left clicking, the targeted "rocker arm" comes foremost and is in the translucent highlight display state. When the operator double clicks the mouse at this point (position E), that object is selected (a graphical object of the graphic definition data 101 is specified via the graphical object display state table 109) and selection operation ends. Or, if the targeted rocker arm is directly visible, the tablet operation is interrupted by right clicking the mouse to return the mouse to the main window of the 3 D browser and directly select it.

D-2. Method Using Only Horizontal Operation In the manner similar to "D-1. Method using a combination of vertical and horizontal operations", The category of the top level which includes all the parts is visible in the initial state (FIG. 13). When the procedure of this invention is started, the state shifts to the normal direction scanning state. As the mouse is moved horizontally, part in fore side disappear one after another to reveal the internal parts. The foremost one of the elemental parts of the "body" becomes the translucent highlight display state and disappear first of all, and the "engine" which was hidden in the body soon comes out.

Further, the elemental parts of the "engine" disappear one after another from the fore side and the parts comprising the inside of the engine are revealed. When the "cam of exhaust valve" comes foremost and becomes the translucent highlight display state by a further horizontal movement, it is selected by double clicking and select operation is finished. Or, if the targeted cam is directly visible, it can be directly selected by returning the mouse to the initial main window of the 3 D browser. If only this method is enabled, a "slider" may be used in control because the freedom of movement of the mouse is one direction.

While the above example showed a method in which the reference point was updated to the coordinate where the mouse was clicked, an implementation to compulsorily return the mouse position to the reference point without updating it is also possible. In this implementation, the size of the tablet used can be advantageously reduced though an intuitive reaction to the 2 dimensional plane is sacrificed.

Also, in changing the highlight display based on the hierarchical structure, a method may be adopted to change the display state by specifying a set of graphical objects to be highlight displayed from the hierarchical structure, and then looking up the graphical object display state table to specify the position in the table for each of the specified graphical object. This is because it becomes a heavier load to look up a table and less efficient as the number of the objects to be highlight displayed increases.

In this system, a structure of a classification tree which is copied from the hierarchical structure data is prepared, and graphical objects at the end leaf are replaced with indexes of the display state table at the time of initialization. Because a graphical object is expressed by an index of the table rather than the graphic ID in this case, the position of the corresponding graphical object in the table can be directly referred to without looking up the table every time so that this is efficient. Also, when the reference plane changes and the display state table is updated in this case, the classification tree is also updated at the same time.

Effect of the Invention

As described in the above, according to this invention, a truly intended graphical object can be quickly displayed and selected among graphical objects hidden in complex in the screen by a simple mouse operation which can be intuitively understood by the operator in using a graphic software.

While the present invention has been described in terms of preferred embodiments, various alterations and modifications will occur to those skilled in the art without departing from the scope and spirit of the invention. It is intended that the appended claims encompass all such variations and modifications.

We claim:

1. A method of selecting one graphical object among a group of graphical objects displayed in a display screen based on graphic definition information of multiple graphical objects which are managed by hierarchical attribute information on a graphical objects display control apparatus having a display screen and an input device, said method comprising:

(a) a step of displaying a group of graphical objects on said display screen;

(b) a step of displaying on said display screen an operation tablet in which an operable pointer is positioned by said input device;

(c) a step of detecting the movement of said pointer in a first direction on said operation tablet;

(d) a step of modifying a display attribute of a second graphical object ordered next to a first graphical object depending on said graphic definition information in response to the detection of the movement of said pointer in the first direction;

(e) a step of detecting the movement of said pointer in a second direction on said operation tablet;

(f) a step of modifying a display attribute of a third and a fourth graphical object having a common hierarchical attribute information to said second graphical object in response to the detection of the movement of said pointer in the second direction to recognizably display a fifth graphical object on said display screen; and (g) a step of detecting an operator input selecting said fifth graphical object.

2. A method of selecting one graphical object among a group of graphical objects displayed in a display screen based on graphic definition information of multiple graphical objects which are managed by a group relationship on a graphical objects display control apparatus having a display screen and an input device, said method comprising:

(a) a step of modifying a display attribute of a second graphical object ordered next to a first graphical object depending on said graphic definition information in response to an operator input which is classified into a first category and uses said input device; and (b) a step of modifying a display attribute of a third graphical object belonging to a group common to said second graphical object in response to an operator input which is classified into a second category which is different from said first category and uses said input device.

3. A graphical object display control apparatus having a display screen and an input device, said apparatus comprising:

(a) graphic definition data defining a graphical object displayed on said display screen;

(b) graphical object hierarchy definition data for managing hierarchical attribute information of said graphical object;

(c) a display part for displaying a group of graphical objects on said display screen;

(d) a display processing part for generating an operation tablet in which is positioned a pointer which is operable by said input device;

(e) a display status modifying range determination part (e-1) for modifying a display attribute of a second graphical object ordered next to a first graphical object depending on said graphic definition information in response to the detection of the movement of said pointer in a first direction, and (e-2) for modifying a display attribute of a third and a fourth graphical object having a common hierarchical attribute information to said second graphical object in response to the detection of the movement of said pointer in a second direction to recognizably display a fifth graphical object on said display screen; and (f) an event detection part for detecting an operator input selecting said fifth graphical object.

4. A graphical object display control apparatus having a display screen and an input device, said apparatus comprising:

(a) graphic definition data defining a graphical object displayed on said display screen;

(b) graphical object hierarchy definition data for managing a group relationship between said graphical objects;

(c) a display status modifying range determination part (c-1) for modifying a display attribute of a second graphical object ordered next to a first graphical object depending on said graphic definition information in response to an operator input which is classified into a first category and uses said input device, and (c-2) for modifying a display attribute of a third graphical object belonging to a group common to said second graphical object in response to an operator input which is classified into a second category which is different from said first category and uses said input device.

5. A recording medium for storing a program for controlling selection of one graphical object among a group of graphical objects displayed in a display screen based on graphic definition information of multiple graphical objects which are managed by hierarchical attribute information on a graphical objects display control apparatus having a display screen and an input device, said control program comprising:

(a) a program code indicating said display control apparatus to display a group of graphical objects on said display screen;

(b) a program code indicating said display control apparatus to display on said display screen an operation tablet in which an operable pointer is positioned by said input device;

(c) a program code indicating said display control apparatus to detect the movement of said pointer in a first direction on said operation tablet;

(d) a program code indicating said display control apparatus to modify a display attribute of a second graphical object ordered next to a first graphical object depending on said graphic definition information in response to the detection of the movement of said pointer in the first direction;

(e) a program code indicating said display control apparatus to detect the movement of said pointer in a second direction on said operation tablet;

(f) a program code indicating said display control apparatus to modify a display attribute of a third and a fourth graphical object having a common hierarchical attribute information to said second graphical object in response to the detection of the movement of said pointer in the second direction to recognizably display a fifth graphical object on said display screen; and (g) a program code indicating said display control apparatus to detect an operator input selecting said fifth graphical object.

6. A recording medium for storing a program for controlling selection of one graphical object among a group of graphical objects displayed in a display screen based on graphic definition information of multiple graphical objects which are managed by a group relationship on a graphical objects display control apparatus having a display screen and an input device, said control program comprising:

(a) a program code indicating said display control apparatus to modify a display attribute of a second graphical object ordered next to a first graphical object depending on said graphic definition information in response to an operator input which is classified into a first category and uses said input device; and (b) a program code indicating said display control apparatus to modify a display attribute of a third graphical object belonging to a group common to said second graphical object in response to an operator input which is classified into a second category which is different from said first category and uses said input device.

* * * * *

UNITED STATES PATENT AND TRADEMARK OFFICE
CERTIFICATE OF CORRECTION

PATENT NO.    : 6,337,700 B1
DATED         : January 8, 2002
INVENTOR(S)   : Kinoe et al.

It is certified that error appears in the above-identified patent and that said Letters Patent is hereby corrected as shown below:

<u>Column 3,</u>
Line 1, delete "lie".

Signed and Sealed this

Third Day of September, 2002

Attest:

Attesting Officer

JAMES E. ROGAN
*Director of the United States Patent and Trademark Office*